United States Patent
Barani et al.

(10) Patent No.: US 10,259,281 B2
(45) Date of Patent: Apr. 16, 2019

(54) LONGITUDINAL MEMBER, AMPHIBIOUS UNDERCARRIAGE AND VEHICLE

(71) Applicant: TRACK ONE S.R.L., Modena (IT)

(72) Inventors: Stefano Barani, Modena (IT); Marco Gelmuzzi, Modena (IT)

(73) Assignee: Track One S.R.L., Modena (IT)

( * ) Notice: Subject to any disclaimer, the term of this patent is extended or adjusted under 35 U.S.C. 154(b) by 0 days.

(21) Appl. No.: 15/775,721

(22) PCT Filed: Nov. 11, 2016

(86) PCT No.: PCT/IB2016/056801
§ 371 (c)(1),
(2) Date: May 11, 2018

(87) PCT Pub. No.: WO2017/081650
PCT Pub. Date: May 18, 2017

(65) Prior Publication Data
US 2019/0001770 A1    Jan. 3, 2019

(30) Foreign Application Priority Data

Nov. 11, 2015   (IT) .................. 102015000071583

(51) Int. Cl.
*B60F 3/00*     (2006.01)
*B62D 55/06*    (2006.01)
(Continued)

(52) U.S. Cl.
CPC .......... *B60F 3/0015* (2013.01); *B60F 3/0038* (2013.01); *B62D 55/06* (2013.01);
(Continued)

(58) Field of Classification Search
CPC ...... B60F 3/0015; B60F 3/0038; B62D 55/06; B62D 55/12; B62D 55/20; E02F 9/02
See application file for complete search history.

(56) References Cited

U.S. PATENT DOCUMENTS

| | | | |
|---|---|---|---|
| 4,838,373 A | * | 6/1989 | Price ...................... A01D 67/00 |
| | | | 180/9.46 |
| 4,846,092 A | | 7/1989 | Wilson |

(Continued)

FOREIGN PATENT DOCUMENTS

| | | |
|---|---|---|
| DE | 102014006109 A1 | 10/2015 |
| WO | 2012039600 A1 | 3/2012 |

OTHER PUBLICATIONS

International Search Report in PCT/IB2016/056801 dated Mar. 16, 2017.

(Continued)

*Primary Examiner* — Stephen P Avila
(74) *Attorney, Agent, or Firm* — Cittone Demers & Arneri LLP; Henry J. Cittone

(57) ABSTRACT

Longitudinal member (10) for amphibious undercarriage, which internally defines one or more air chambers (2) for its own buoyancy and externally at least one sliding trail (4), wherein the longitudinal member (10) comprises one or more tracks (6, 6'), which develop around the sliding trail (4) and comprising chains (8, 12) flanked to each other and slidably mounted, each chain (8, 12) comprising concatenated links (14, 16), forged in one piece, fluid-powered motor means, attached to the longitudinal member (10) and configured to promote the sliding of the track (6, 6') or plurality of tracks through the chains (8, 12). The forged links (14,16) are forged in one piece. The invention further relates to an undercarriage and an amphibious vehicle.

20 Claims, 18 Drawing Sheets

(51) Int. Cl.
*B62D 55/12* (2006.01)
*E02F 9/02* (2006.01)
*B62D 55/20* (2006.01)
*E02F 3/32* (2006.01)

(52) U.S. Cl.
CPC ............. *B62D 55/12* (2013.01); *B62D 55/20* (2013.01); *E02F 9/02* (2013.01); *E02F 3/32* (2013.01)

(56) References Cited

U.S. PATENT DOCUMENTS

| | | |
|---|---|---|
| 5,379,709 A | 1/1995 | Wilkerson |
| 5,505,274 A * | 4/1996 | Satzler ............... B62D 55/0842 180/9.5 |
| 6,482,053 B1 | 11/2002 | Prestenbach |
| 2008/0284245 A1* | 11/2008 | Livesay ................ B62D 55/14 305/193 |

OTHER PUBLICATIONS

Written Opinion of the International Searching Authority in PCT/IB2016/056801 dated Mar. 16, 2017.

\* cited by examiner

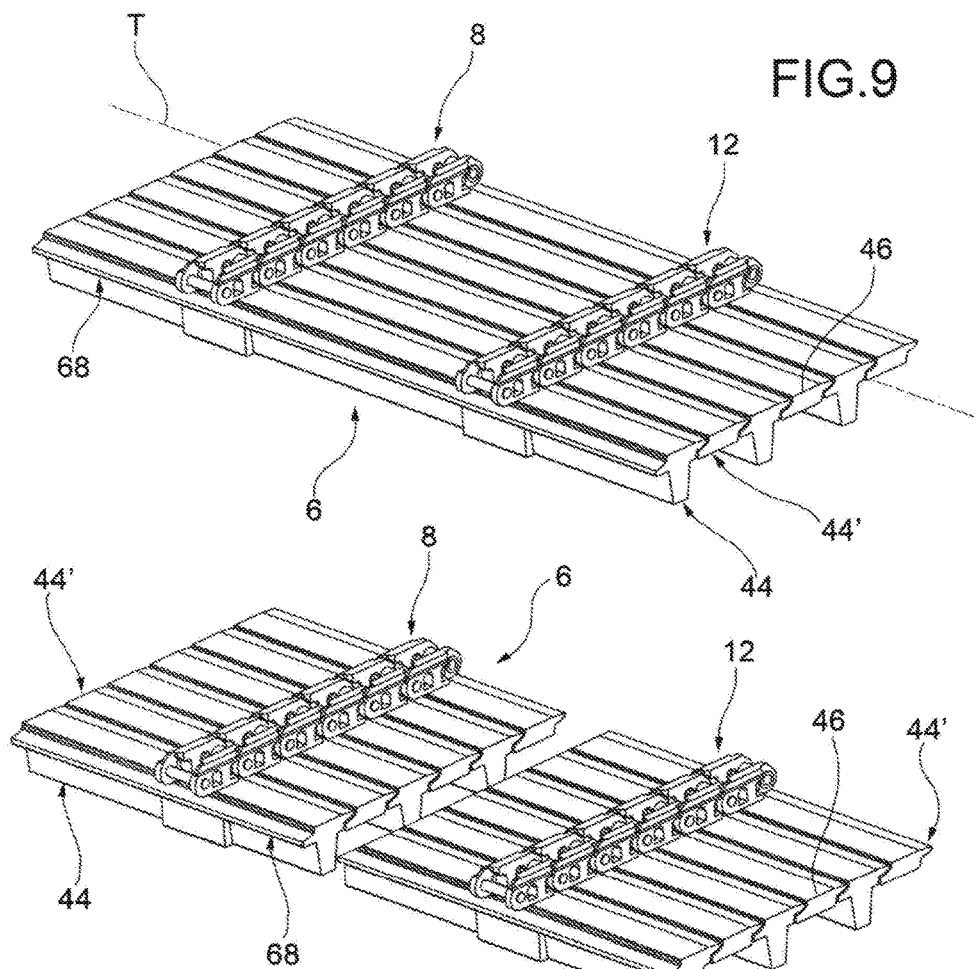
FIG.9
FIG.10
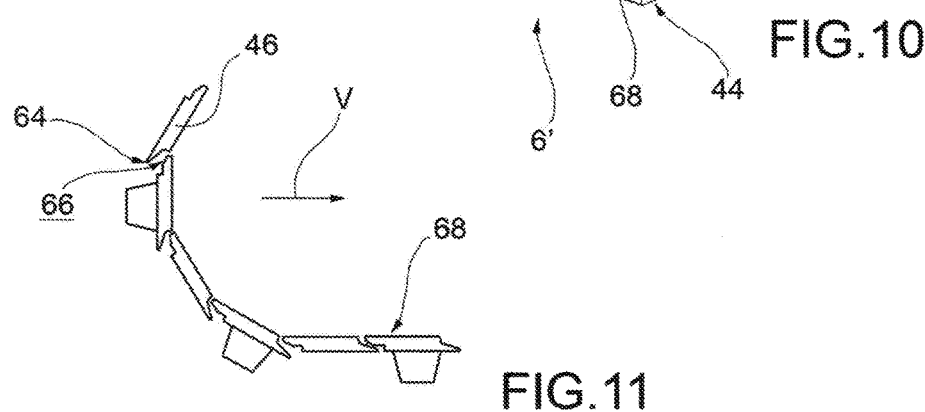
FIG.11

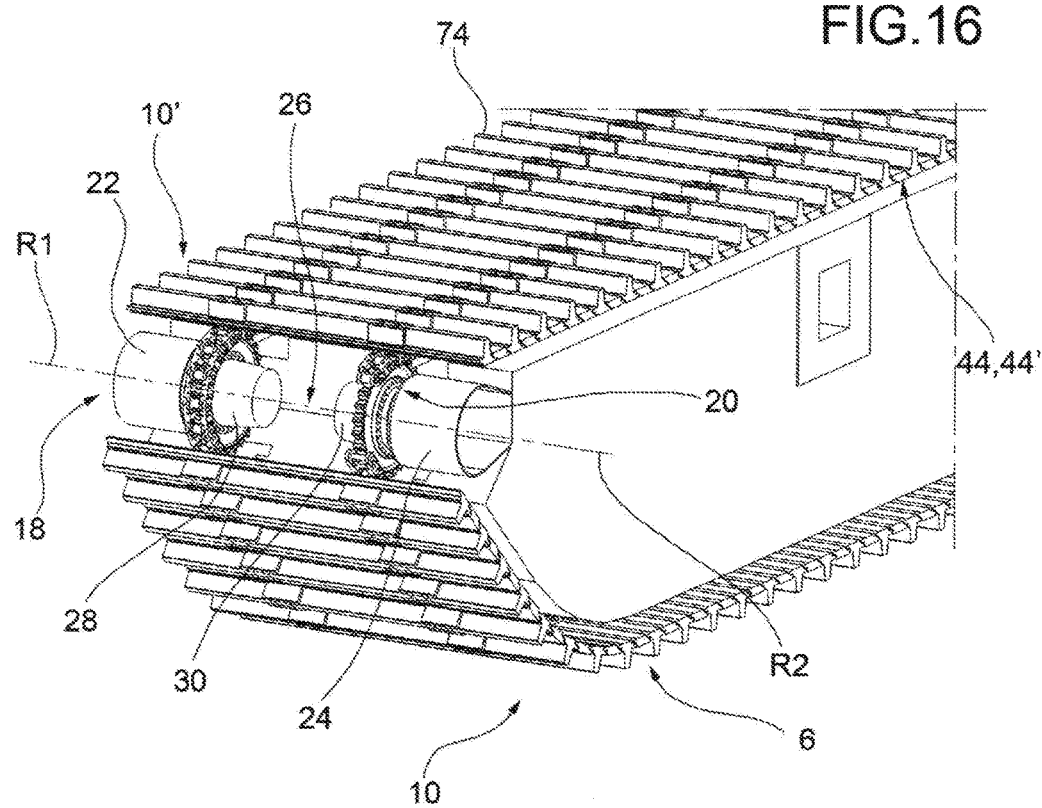
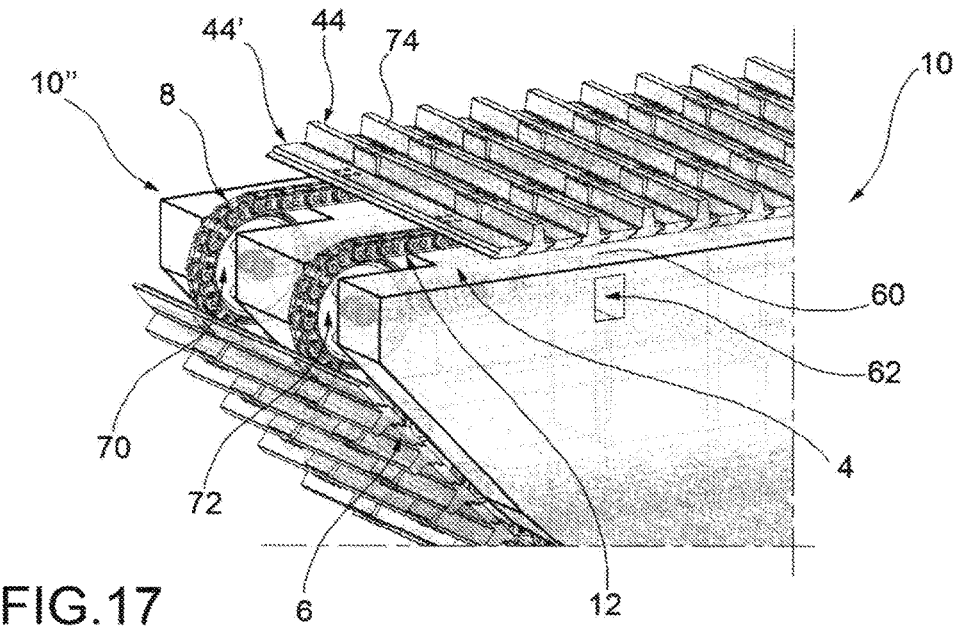

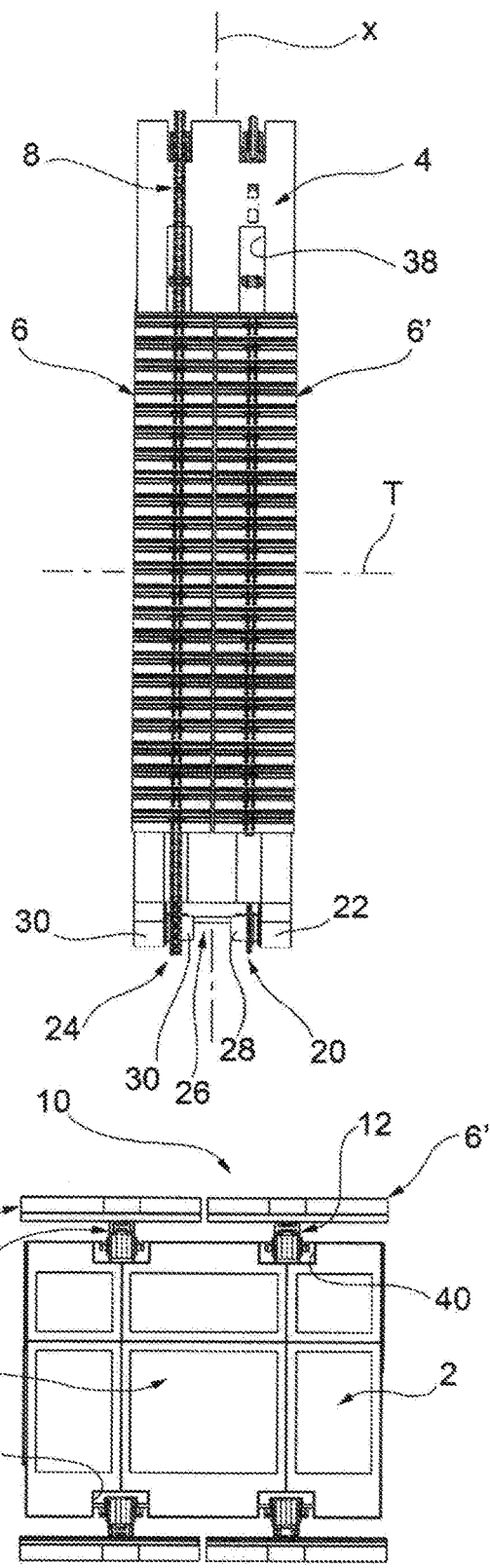

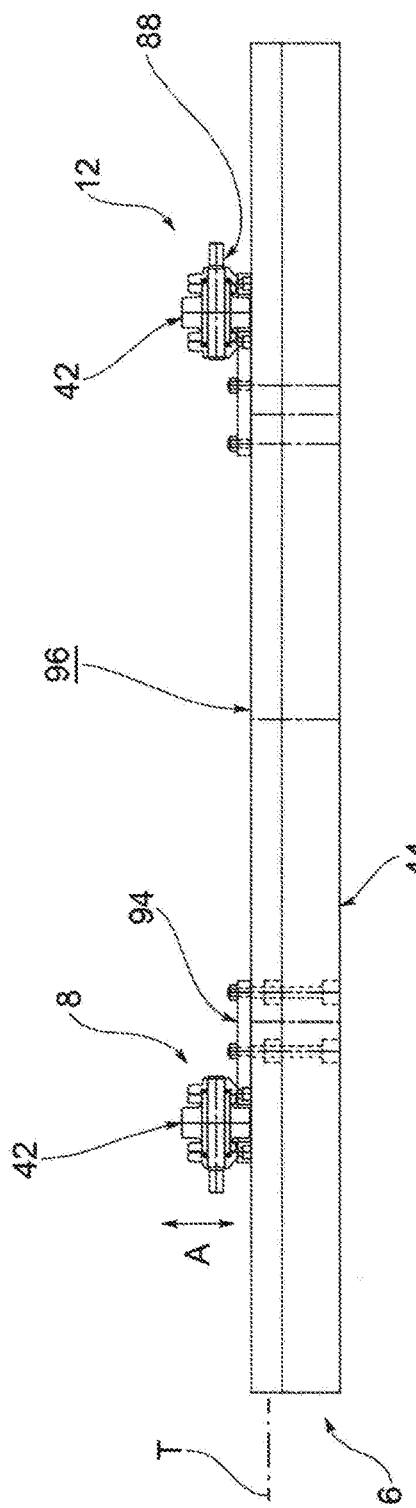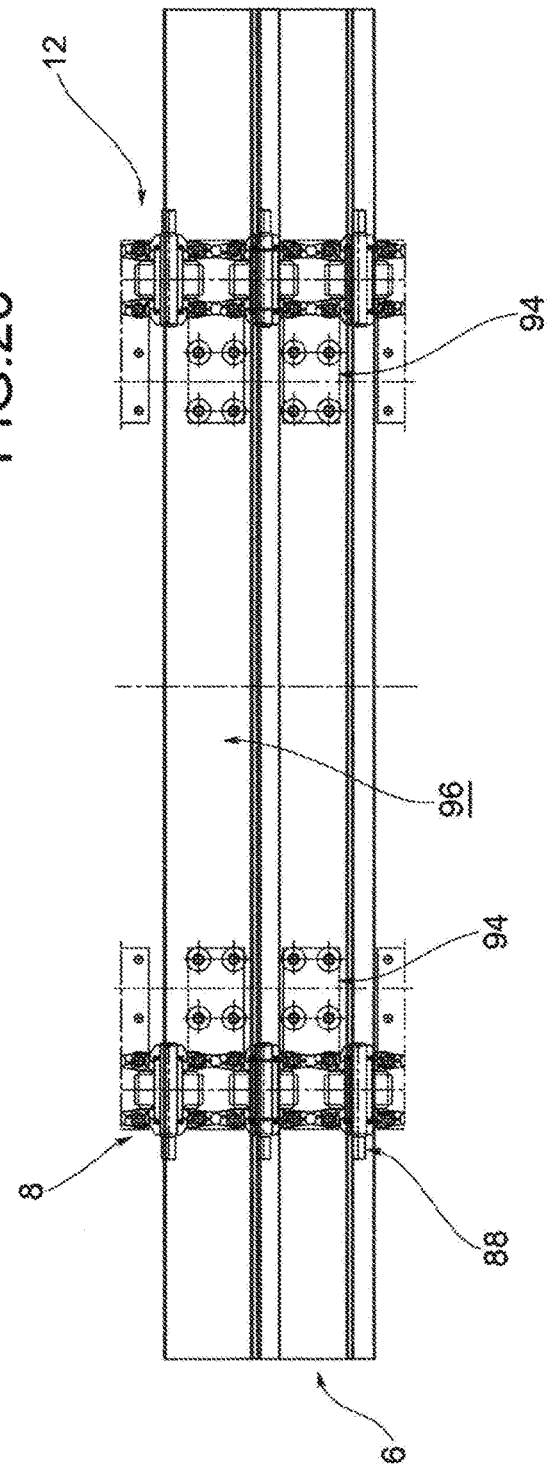

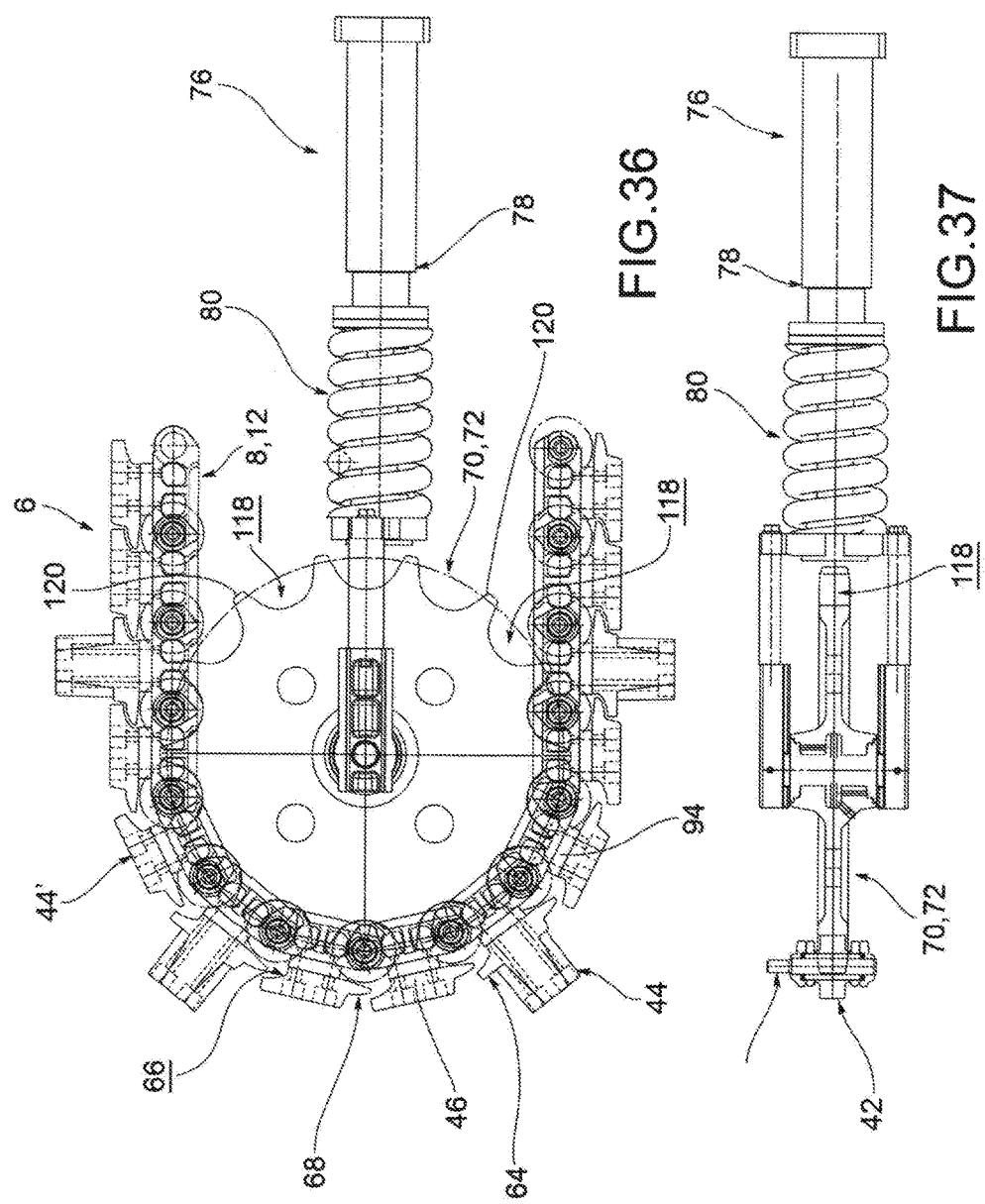

LONGITUDINAL MEMBER, AMPHIBIOUS UNDERCARRIAGE AND VEHICLE

CROSS-REFERENCE TO RELATED APPLICATIONS

This application is the U.S. national stage of PCT International Patent Application No. PCT/IB2016/056801, filed Nov. 11, 2016, which claims priority to Italian Application No. 102015000071583 filed on Nov. 11, 2015, the disclosures of each of which are incorporated herein by reference in their entireties.

This invention relates to a longitudinal member for an amphibious undercarriage, an amphibious undercarriage and work vehicle.

The use of amphibious vehicles equipped a floating undercarriage that supports an operating machine is widely used, in particular for operating in marshy areas, lake environments or similar. These vehicles, which are commonly referred to as "swamp excavators" or "marsh buggies", have the advantage of working effectively in water or mud, without sinking of course, and also allowing satisfactory freedom of action on firm ground.

One of the main drawbacks of the known systems lies in the poor performance of such vehicles on land, especially with regard to strength and resistance to wear, which drastically reduce the useful life of such means.

In other words, the known amphibious vehicles provide very good performance in water, but poor results on firm and/or muddy ground.

This invention belongs to the preceding context, proposing to provide a longitudinal member and an undercarriage with performance in water at least comparable to the amphibious vehicles currently used, but with behaviour and reliability on land that is drastically improved with respect to the known systems.

This objective is achieved by means of a longitudinal member according to claim 1, an undercarriage according to claim 18, and by means of a vehicle according to claim 20. The claims dependent on these show preferred or advantageous embodiments.

The object of this invention will now be described in detail, with the help of the accompanying drawings, in which:

FIGS. 9 and 10 illustrate parts of track according to possible embodiments, in particular with only one track or two tracks side by side for each longitudinal member, while FIG. 11 schematically shows the mutual movement of the shoes with respect to the direction of movement V of the vehicle;

FIGS. 16 and 17 show perspective views of opposite end portions of the longitudinal member, according to an implementation of the invention, with a partial omission of the track shoes;

FIGS. 18 and 19 represent respective views corresponding to FIGS. 4 and 5 respectively, but according to a different embodiment;

Figure 5:
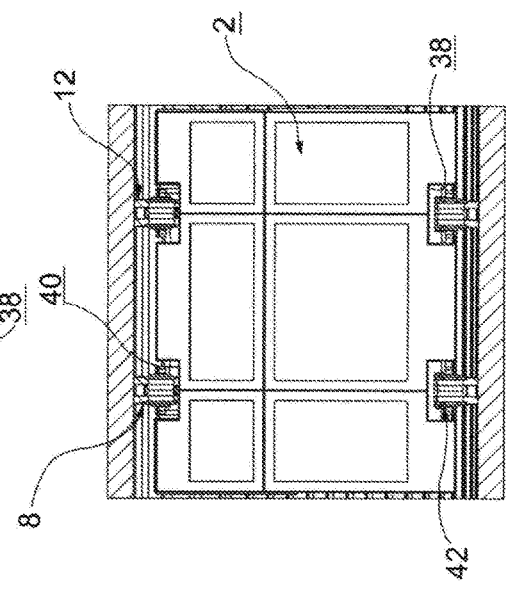
Figure 8:
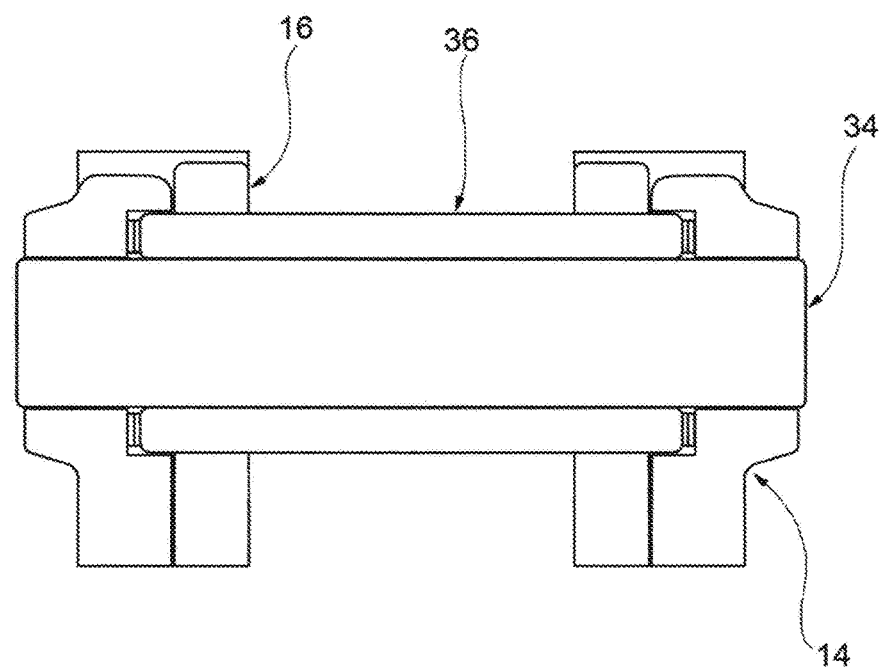
Figure 20:
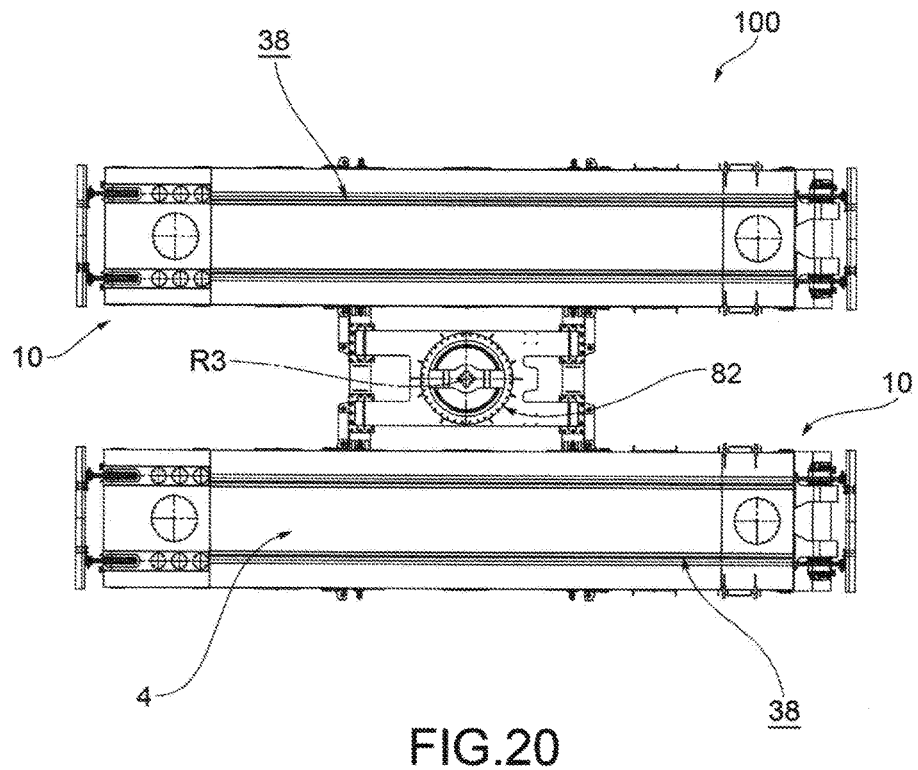
Figure 21:
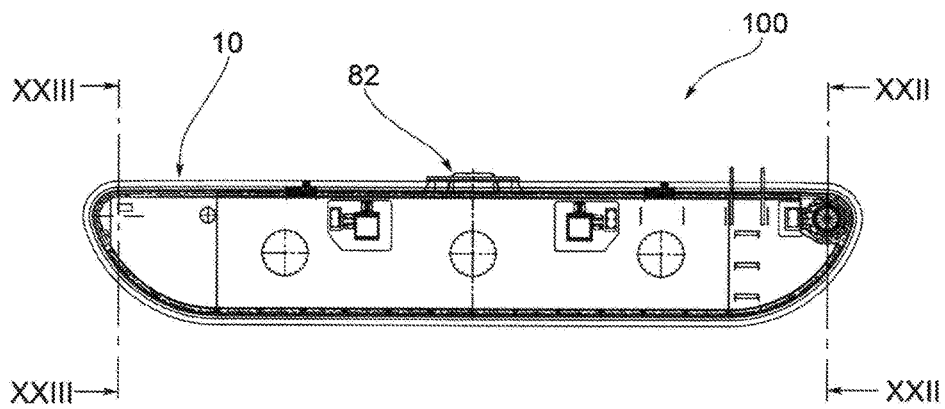
Figure 22:
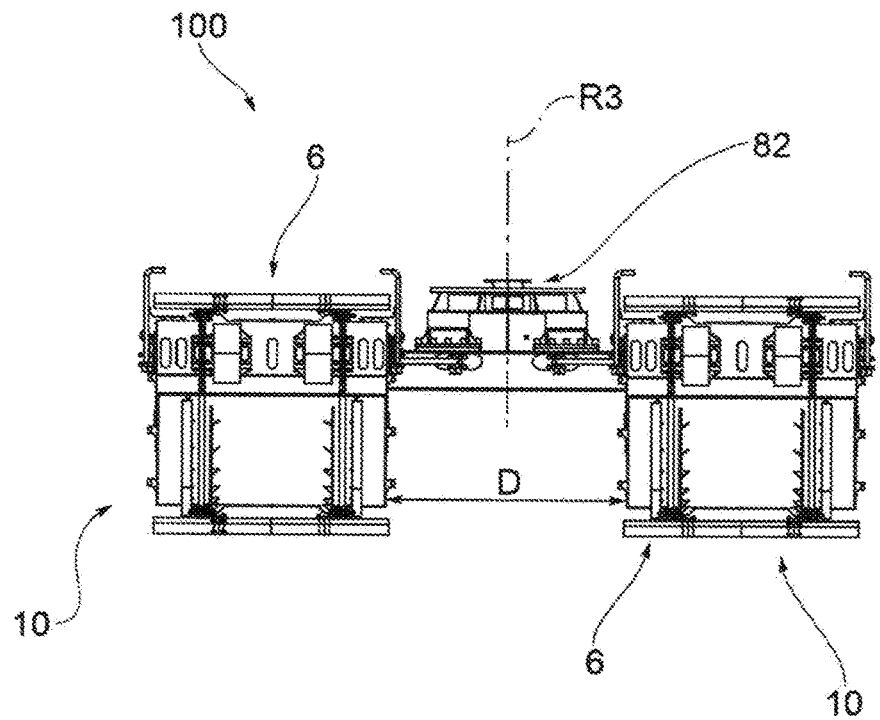
Figure 23:
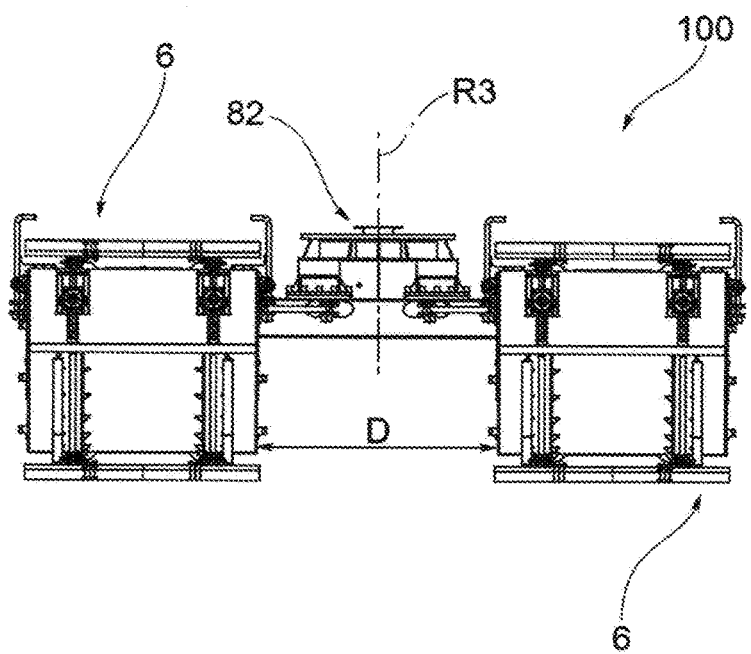
Figure 24:
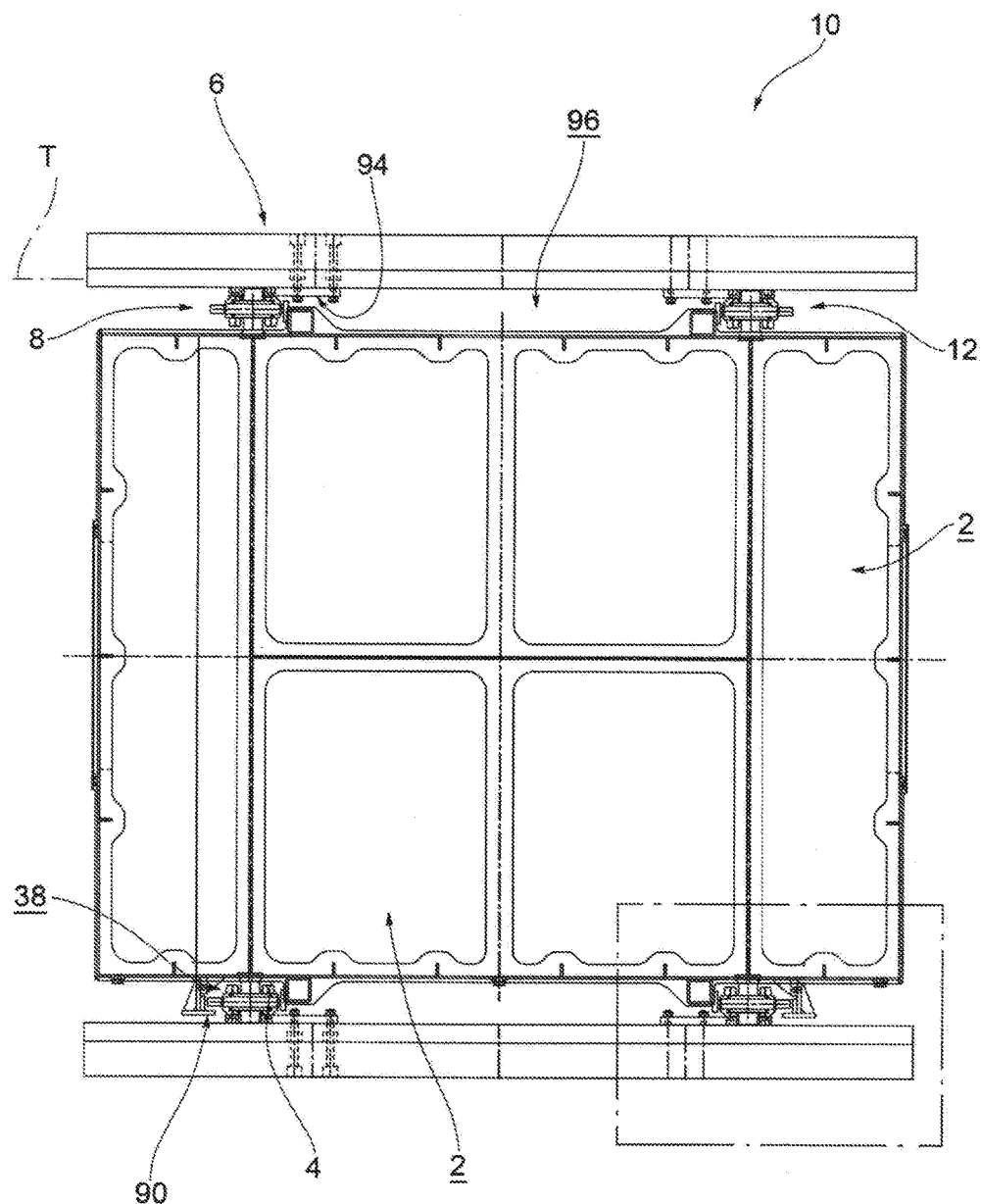
Figure 25:
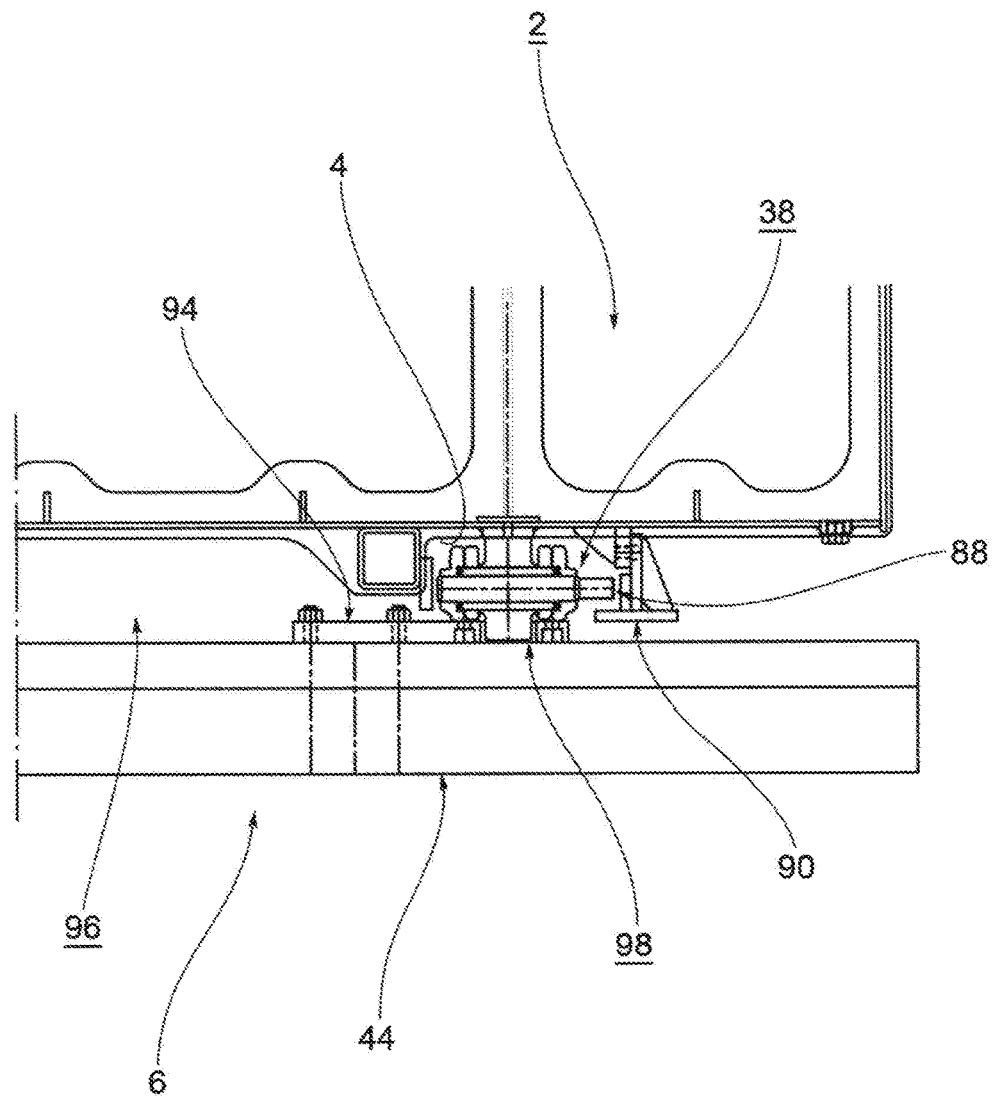
Figure 28:
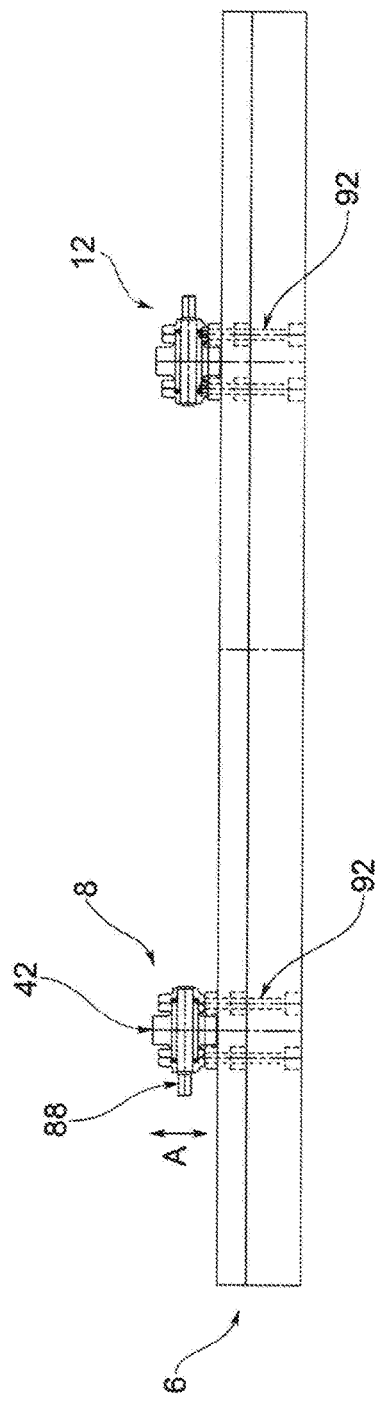
Figure 29:
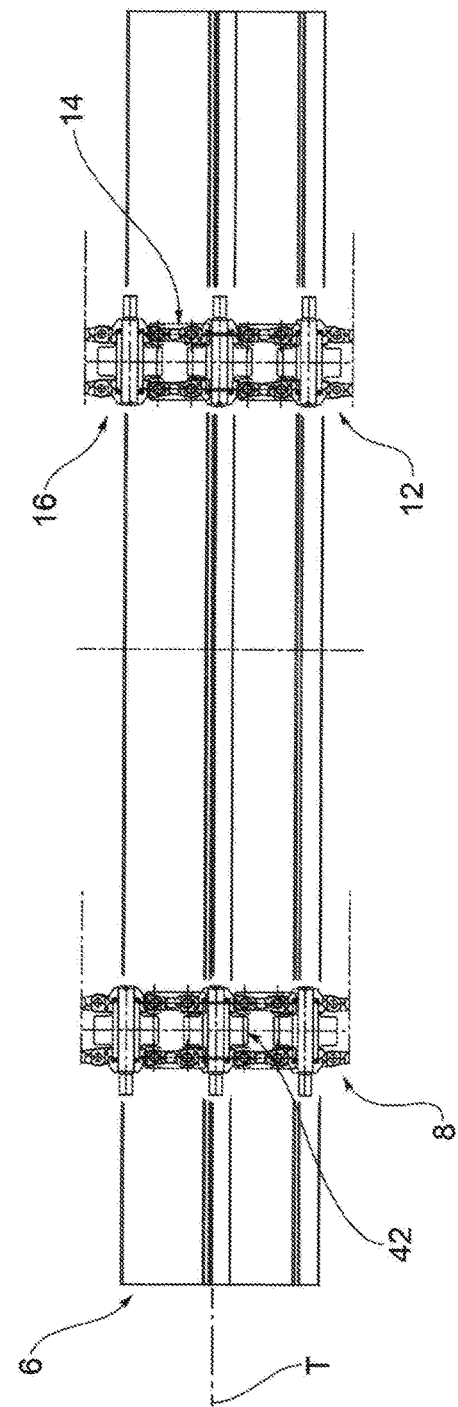
Figure 30:
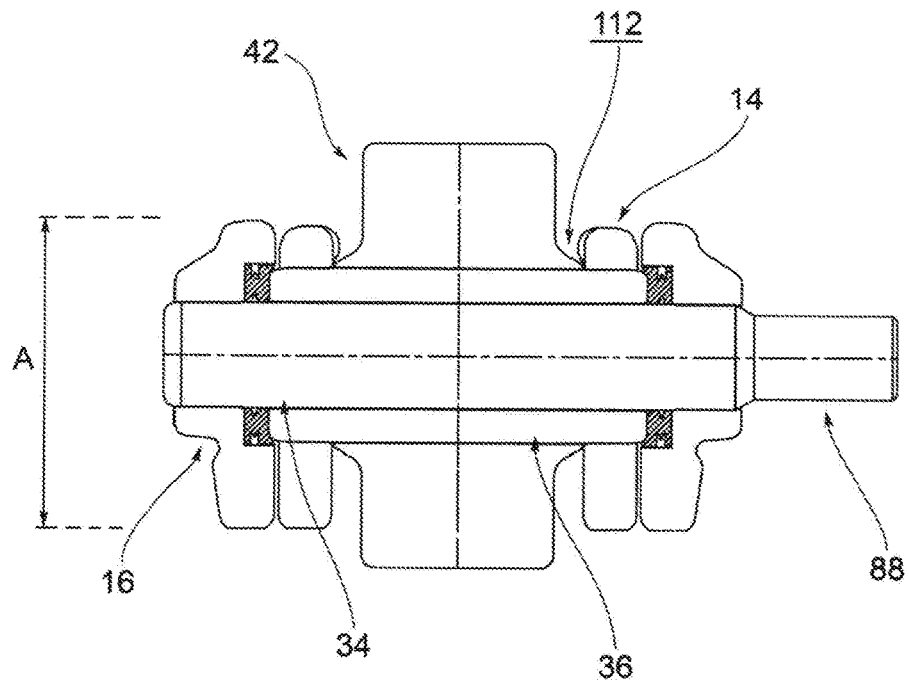
Figure 35:
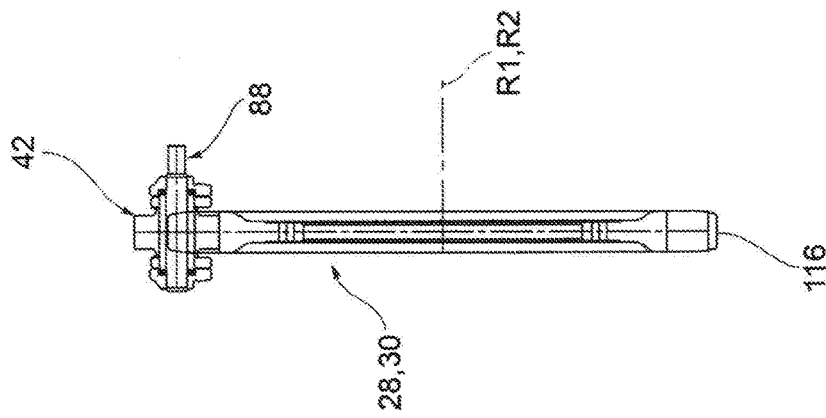
Figure 34:
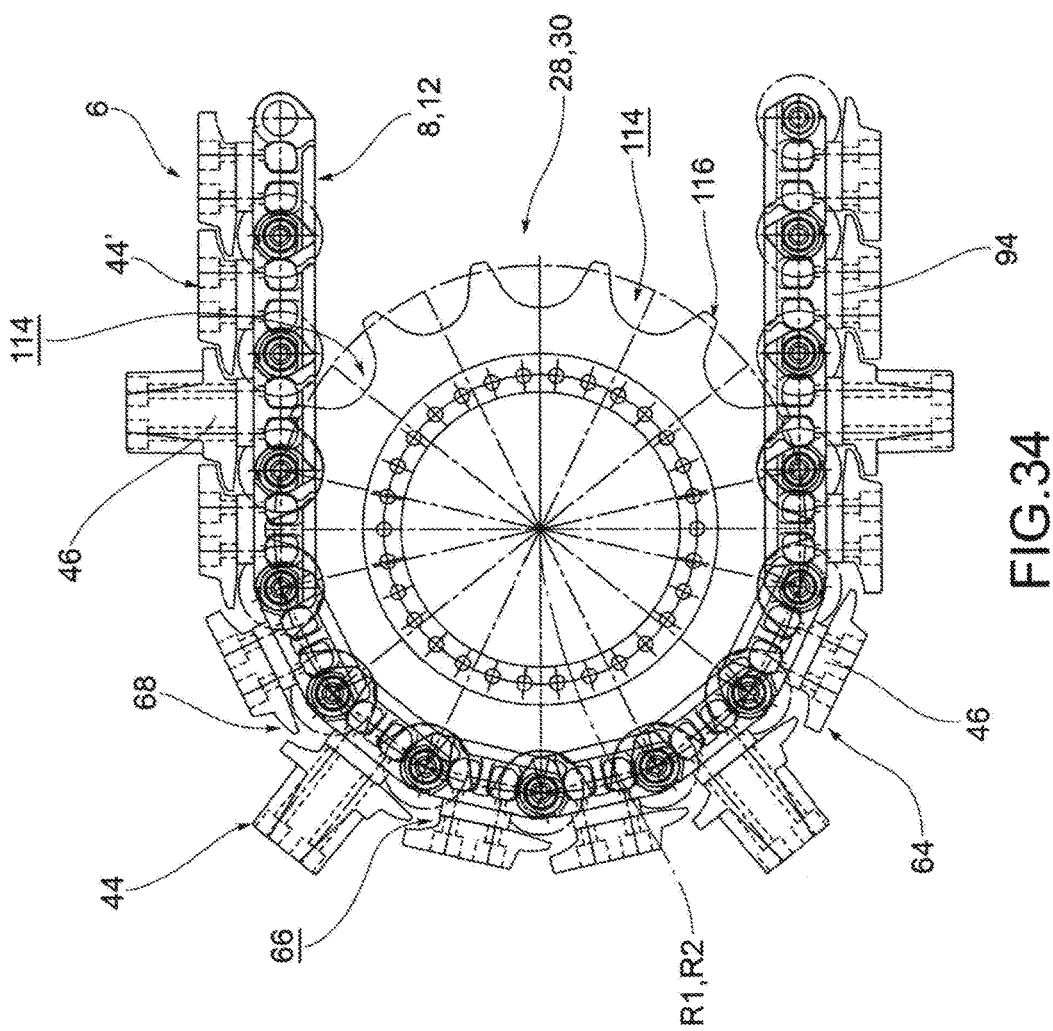

FIGS. 20, 21 respectively show a view from below and a side view of an undercarriage according to the present invention, according to a further variant, where in FIG. 20 the tracks have been partially omitted;

FIGS. 22, 23 shows cross-sections of the longitudinal member according to FIG. 21, along the planes XXII-XXII and XXIII-XXIII shown in said figure;

FIGS. 24, 25 respectively show a cross-section corresponding to FIG. 5 according to a different embodiment and an enlargement of the area highlighted in FIG. 24;

FIGS. 26, 27, and 28, 29 show in pairs a front view and a plan view of the inside of a track according to different embodiments;

FIGS. 30, 31, 32 and 33 show cross-sections through an articulation pin of a chain as in FIG. 8, according to possible variants of the invention;

FIGS. 34 and 35 schematically show a side view and a front view of the motor means according to the invention, where in FIG. 35 the track has been partly omitted for greater clarity;

FIGS. 36, 37 show a side view and a view from above of the return means according to the invention, wherein in FIG. 37 the track has been partly omitted for reasons of clarity.

Reference number 1 identifies, in its entirety, an amphibious work vehicle comprising at least one longitudinal member 10 or comprising an undercarriage 100, according to any of the embodiments illustrated below.

It should be clarified that, in this invention, the term "amphibious" means a vehicle capable of moving in water, marshy or lake areas without sinking, and further configured to move freedom of manoeuvring on solid or compact soils such as clay, wet farmland or similar.

Unless otherwise specified, in this description the term "longitudinal" means a direction along a prevalent development axis X of the longitudinal member; in contrast, the term "transverse" means an incident direction, preferably orthogonal, with respect to said axis X.

Figure 1:
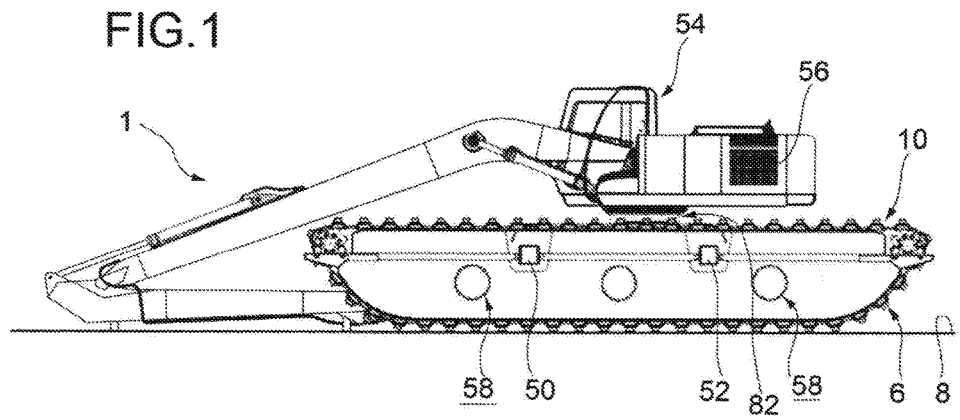
FIG. 1 shows a vehicle covered by this invention, according to a possible variant.
Figure 2:
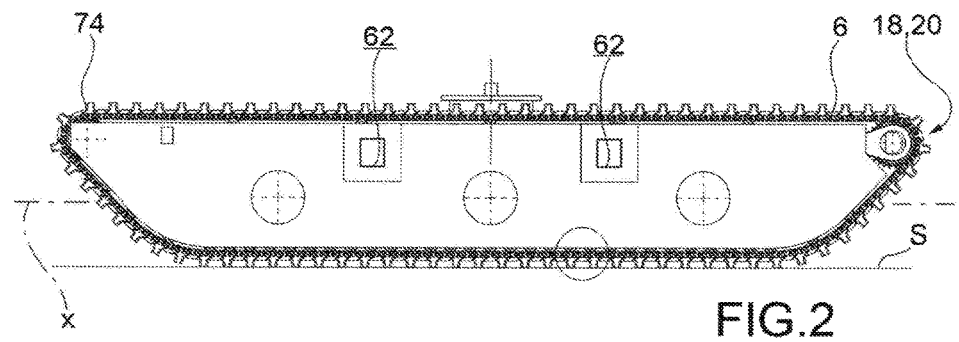
FIGS. 2, 3 and 4 illustrate, respectively, a side view, a side view in longitudinal section and a view from below of a longitudinal member according to a possible embodiment, where, in FIG. 4, the tracks have been partially omitted.

In the embodiment of FIG. 1, the amphibious vehicle 1 is a bulldozer or an excavator. However, this variant should not be considered as limiting the scope of this invention.

According to an embodiment, such vehicle 1 comprises fluid-power means 34,56, in particular at least partially accommodated in correspondence of the operating unit 54 supported by the undercarriage 100 or by the at least one longitudinal member 10 of the vehicle 1.

Figure 12:
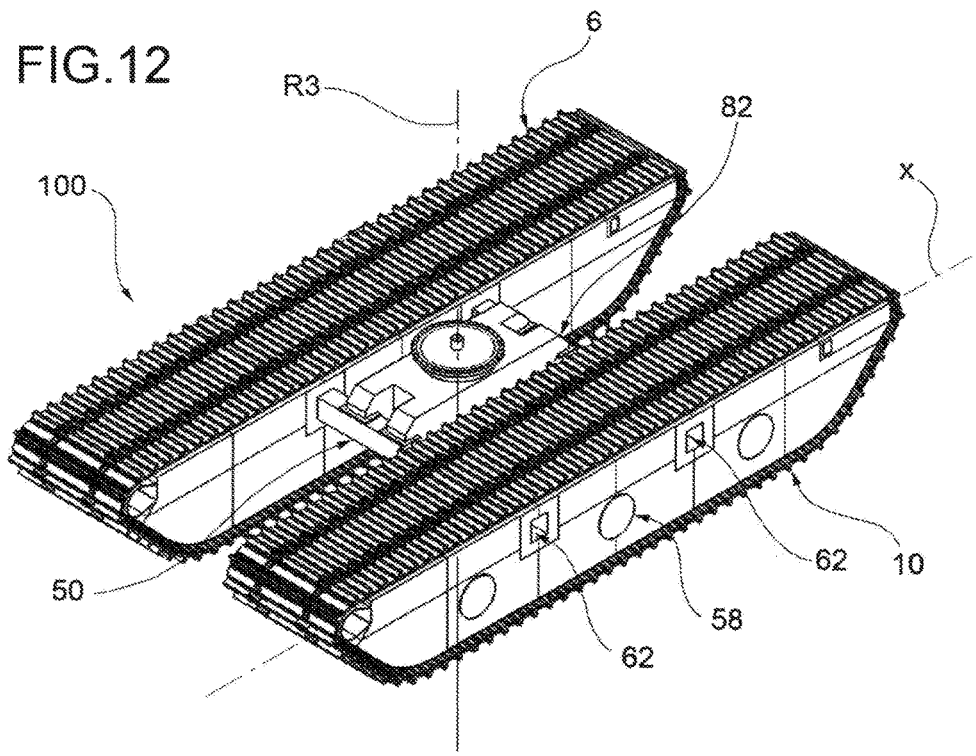
FIGS. 12, 13 and 14 represent, respectively, a perspective view, a front view and a view from above of an undercarriage of this invention, according to a variant, in which the lower track (according to the orientation of the figure) was omitted.

As shown for example in FIG. 12, an undercarriage 100 includes a pair of longitudinal members 10, of which more will be said below, connected by one or more transverse elements 50,52, for example in the form of sleepers.

According to an embodiment, the transverse element 50,52 is shape-coupled with each longitudinal member, this element being preferably inserted into a housing compartment 62 (for example pass-through) delimited by the longitudinal members.

Figure 13:
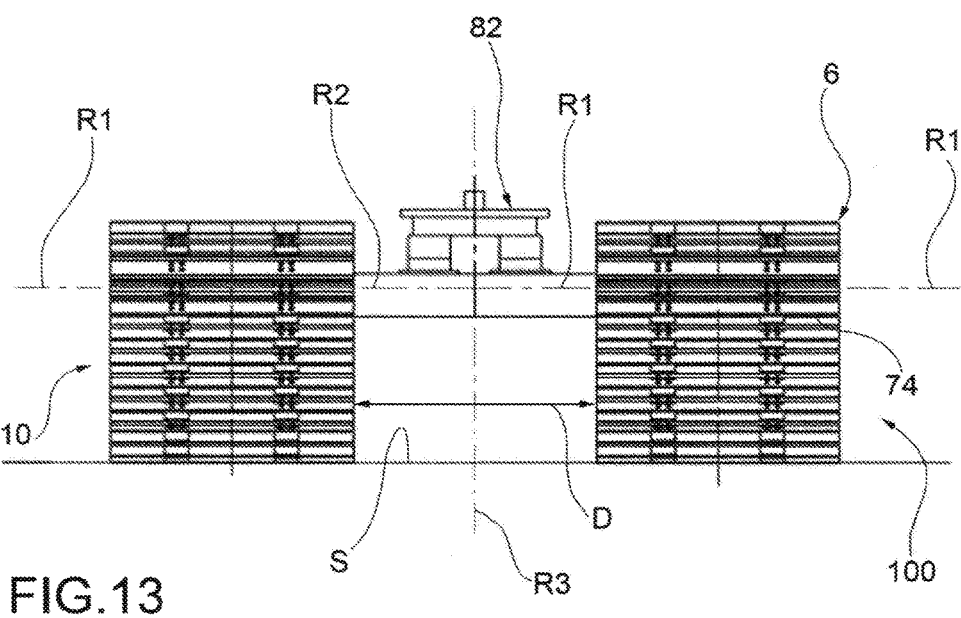
Figure 14:
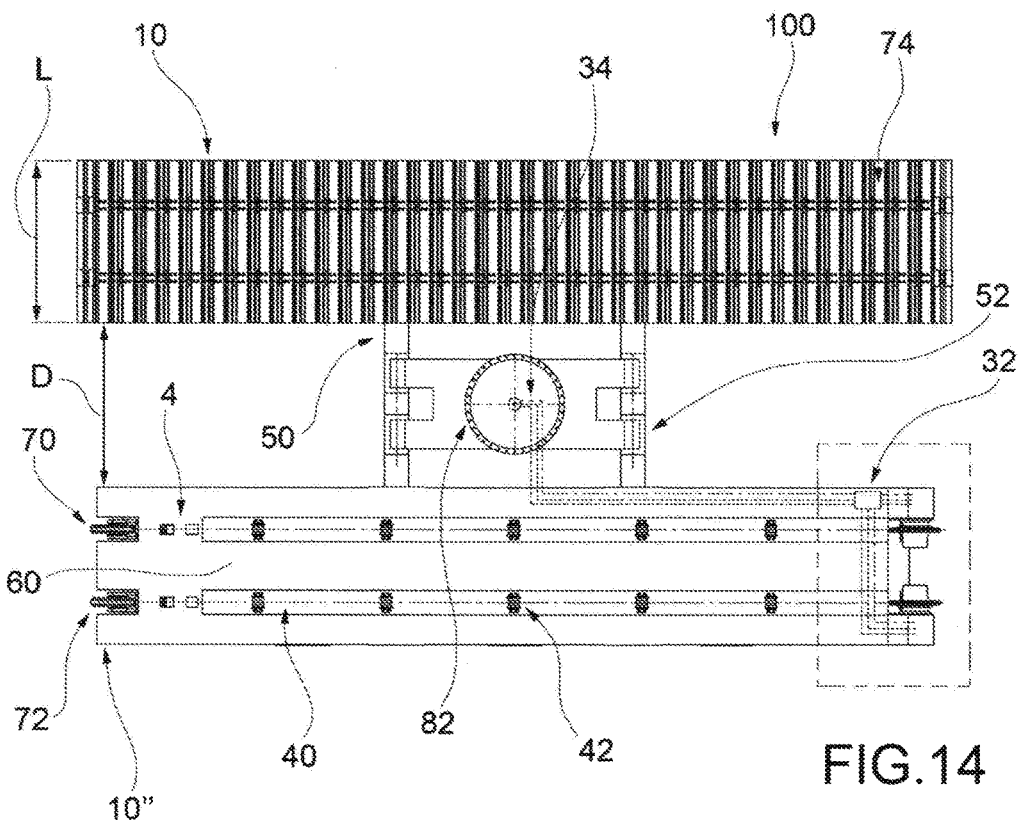
Figure 15:
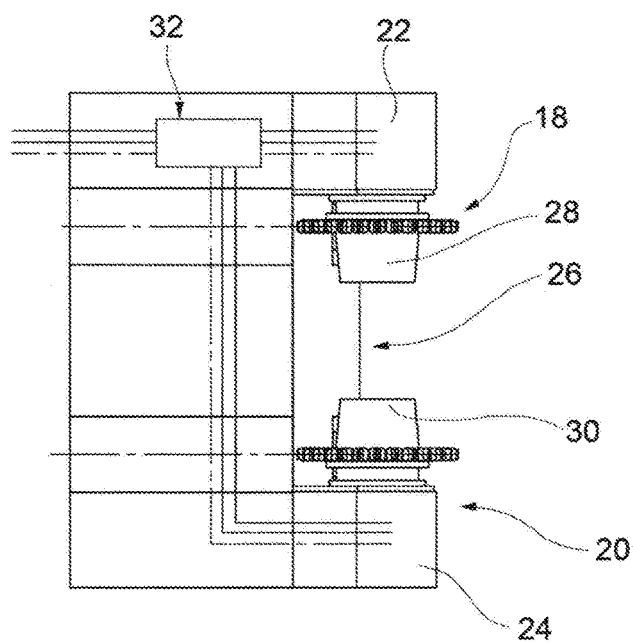
FIG. 15 illustrates an enlargement of the highlighted area of FIG. 14, in which the fluid power pipes of the motors are visible.

Associated with a pair of transverse elements 50,52, the undercarriage 100 it could also comprise a support base 82, for the rotatable support of the operating unit 54 around a joint axis R3. This axis R3 is shown in FIGS. 12 and 13 with a substantially vertical orientation.

According to an embodiment not illustrated, the transverse element 50,52 comprises a linear actuator, preferably of hydraulic type, adjustable in extension in order to decrease/increase the mutual distance D between the longitudinal members. Optionally, this element 50,52 also comprises mechanical stopping means of a desired distance between said longitudinal members.

A longitudinal member 10 internally defines one or more air chambers 2 at least for its buoyancy and externally at least one sliding trail 4.

Advantageously, the air chambers 2 are in sufficient number and volume to ensure the buoyancy of the undercarriage 100, or of the vehicle 1 comprising the undercarriage.

According to a variant, the air chambers 2 are sealed.

According to a further variant, at least one air chamber 2 can be inspected through a closable access mouth 58.

According to a still further variant, the sliding trail 4 may comprise a peripheral surface 60 of the longitudinal member, which circumscribes the air chamber 2 or the plurality of chambers at least in part.

The longitudinal member 10 comprises one or more tracks 6,6' and fluid-powered motor means, specifically via the fluid-power means 34,56.

The track 6,6', or plurality of them, develops as a ring around the sliding trail 4 and comprises chains 8,12 flanked to each other and slidably mounted.

Therefore, according to different embodiments, the longitudinal member could comprise a single track comprising two or more chains (for example, see FIG. 9), or it could comprise at least two tracks side by side, each comprising at least one chain (FIGS. 10, 18 and 19).

According to a particularly preferred embodiment, the motors 18,20 comprise gearmotors, in particular planetary gearmotors.

In the embodiments shown, the track 6, 6' comprises a plurality of track shoes 44,44' fixed in transverse position T or orthogonal with respect to one or both of the chains 8,12.

In essence, the track shoes 44,44' are the components that—during normal use of the track—come in abutment with a drivable surface S delimited by land. More properly, an outer surface 74 of such shoes comes into contact with the drivable surface S.

Preferably, the track shoes 44,44' are spaced along the ring-like development of the track 6,6', and comprise shoe bases 46 connected (for example directly by means of mechanical fasteners) to the chains 8,12.

According to a first variant, the shoe bases 46 are mutually adjacent and partially overlapping.

Specifically, a first edge 64 of a track shoe delimits a cross recess 66 within which is partially received a second projecting edge 68 of an adjacent track shoe.

According to the variant shown in FIG. 11, at least when the track shoes 44,44' come in correspondence of the motors 18,20 (and optionally in the corresponding return means 70,72), the second projecting edge 68 is partially disengaged from the cross recess 66.

According to a variant not illustrated, a preceding shoe base could be separated from a subsequent shoe base by a free space approximately corresponding longitudinal dimension of a shoe base.

In other words, according to this variant, the track shoes 44,44' alternating with the free spaces to create an alternation of full and empty spaces, in this way reduces or halves the number of shoes needed to partially fill the chain.

According to one embodiment, the track shoes 44, 44' are fixed to the chains 8, 12 by means of attachment means 92, for example threaded means such as screws or the like, crossing in part the thickness of the links 14, 16.

Figure 7:
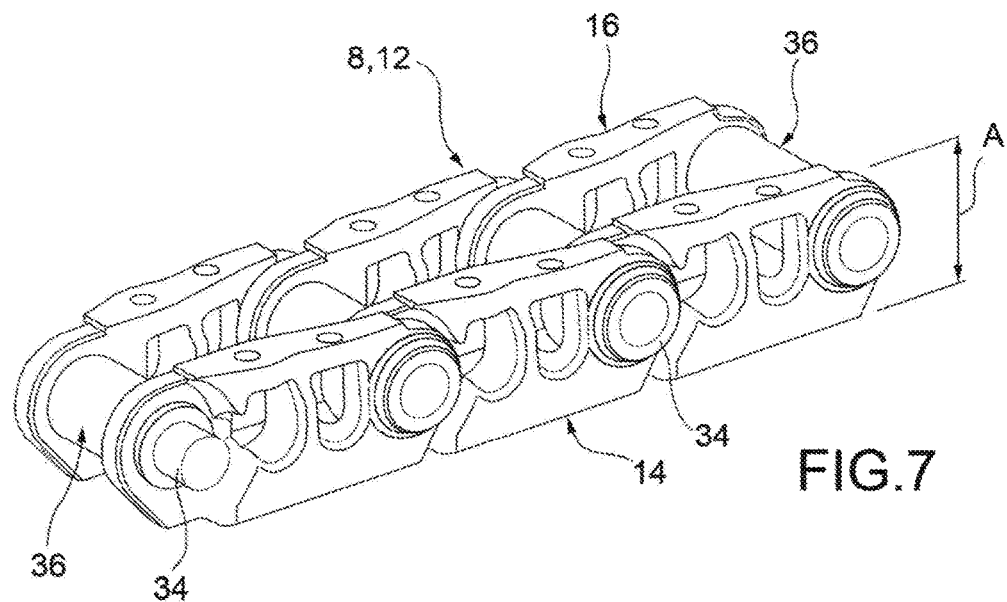
FIGS. 7 and 8 show, respectively, a perspective view of a chain according to a possible variant, and a section through the pin, bushing and pair of links of the chain of FIG. 7.

Referring for example to the variant of FIG. 7, the holes defined above the links 14, 16 are configured to receive the attachment means 92.

According to a further variant, for example schematically shown in FIG. 25, one or more track shoes 44, 44' are fastened to the chains 8, 12 by a pair of anchoring elements 94—for example in the form of plates—which extend from each chain 8, 12 towards an intermediate space 96 defined between said chains. According to such variant, at least one shoe 44, 44' is advantageously fixed to a first end of such element (inwardly of the space 96), while the chain 8, 12 is fixed to a second end of said element.

According to these embodiments, the anchoring elements thus have the function of staggering the attachments between shoe and chain along the width of the longitudinal member 10.

According to an advantageous variant, one or more anchoring elements 94 are counter-shaped 98 with respect to the rolling means 42. More specifically, said one or more anchoring elements are shaped so as to receive at least partly the rolling means 42.

In addition, according to the invention, each chain 8,12 comprises concatenated links 14,16, forged in one piece.

Specifically, the forged links 14,16 are thick-walled to ensure high resistance to compression. Merely by way of example, a thick wall according to this variant could have a thickness greater than or equal to about 3-4 millimeters.

According to preferred variants, the track shoes 44,44' could be made of a polymeric material (for example, a polyamide), or aluminium or one of its alloys, in order to compensate for the weight of the forged links 14,16 of the chain 8,12.

In fact, the weight of a forged link is greater than the weight of a link obtained by bending and welding a sheet, as in the known technique.

Advantageously, the links 14,16 develop away from the sliding trail 4 for a specified link height A (for example, see FIG. 7).

According to a particularly preferred variant, for each pair of links 14,16, the chain 8,12 comprises at least one articulation pin 34 that develops between these links 14,16 and at least one protection bushing 36 associated with play to that pin 34.

More precisely, the protection bushing is mounted coaxially to the pin 34.

According to an advantageous variant, the links 14,16 are dimensioned and/or shaped in such a way that the protection bushing is fully received within the chain 8,12, specifically without projecting from the links.

In other words, the outer diameter of the protection bushing 36 and the link height A are mutually selected so that, during the sliding of the chain 8,12, the bushing is guided at a distance by the sliding trail 4, advantageously without touching the trail.

According to an advantageous embodiment, at the sliding trail 4, the longitudinal member 10 defines longitudinal grooves 38,40 inside of which rolling means (preferably idle), are at least partly housed, on which the chain 8,12 is guided.

According to the variants illustrated in FIGS. 5 and 19, the longitudinal grooves 38,40 are made undercut with respect to the sliding trail 4 that circumscribes them.

According to other variants (see for example FIG. 24 or 25), the sliding trail 4 circumscribes on one side (in particular, at the bottom) the longitudinal grooves 38.

According to a first embodiment, the rolling means 42 have rotation axes integral with the sliding trail 4.

According to a different embodiment, the rolling means 42 have rotation axes integral in translation with the tracks 6, 6', and in particular integral in translation with the chain 8, 12.

It follows that in the first aforementioned variant the rotation axes of the means 42 are constrained to the longitudinal member, while in the different variant the rolling means are in movement along the loop trajectory of the track or plurality thereof.

According to an advantageous variant, the rolling means 42 are fitted coaxially to the aforementioned protection bushing 36 with freedom of rotation with respect to the latter.

Figure 31:
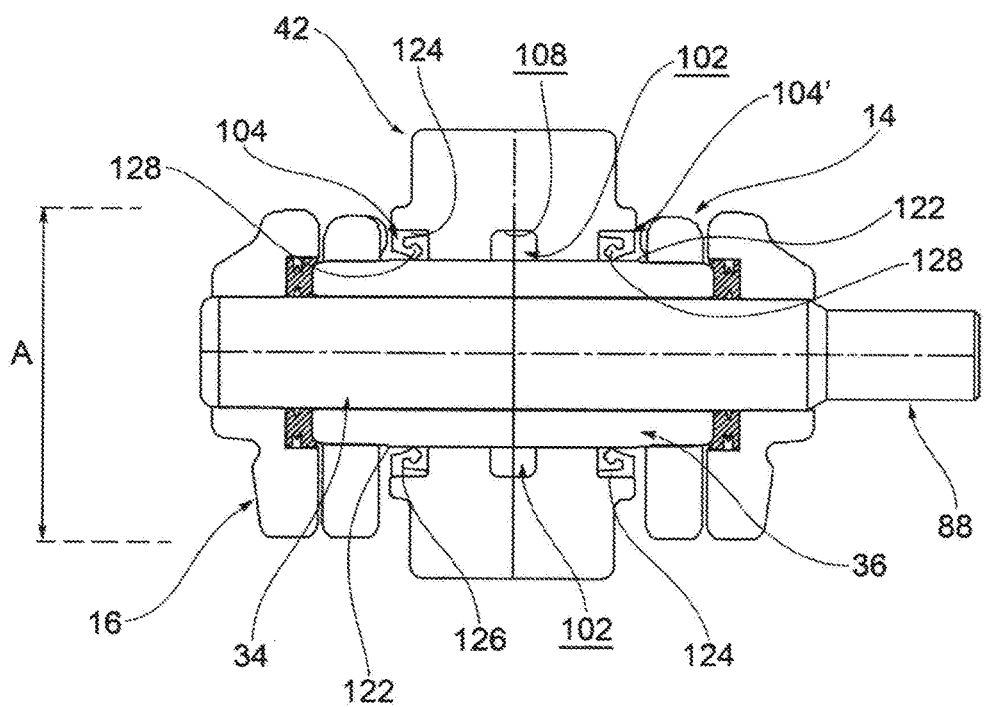
Figure 32:
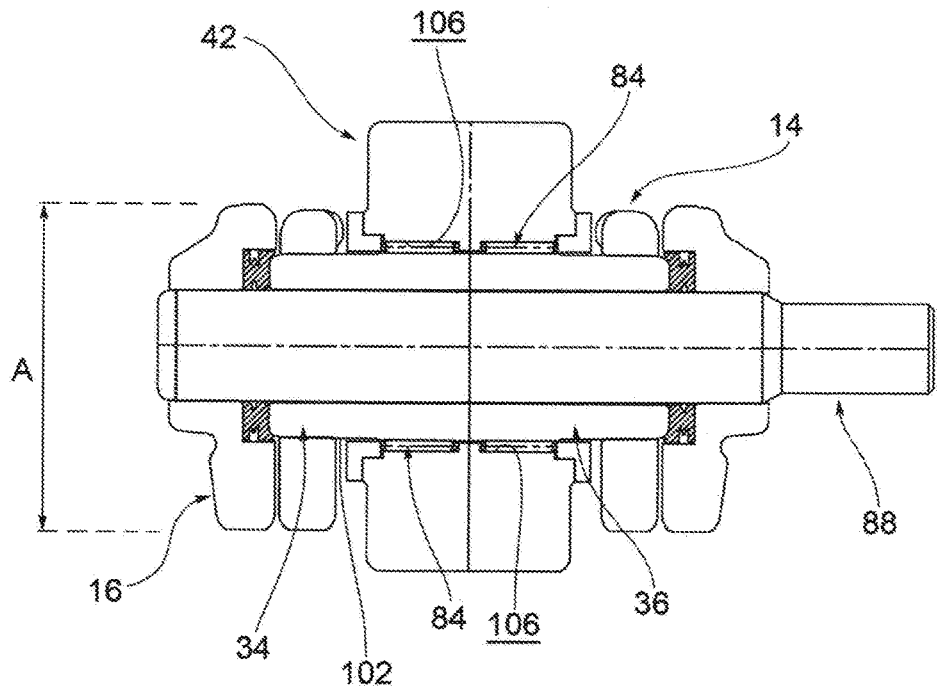
Figure 33:
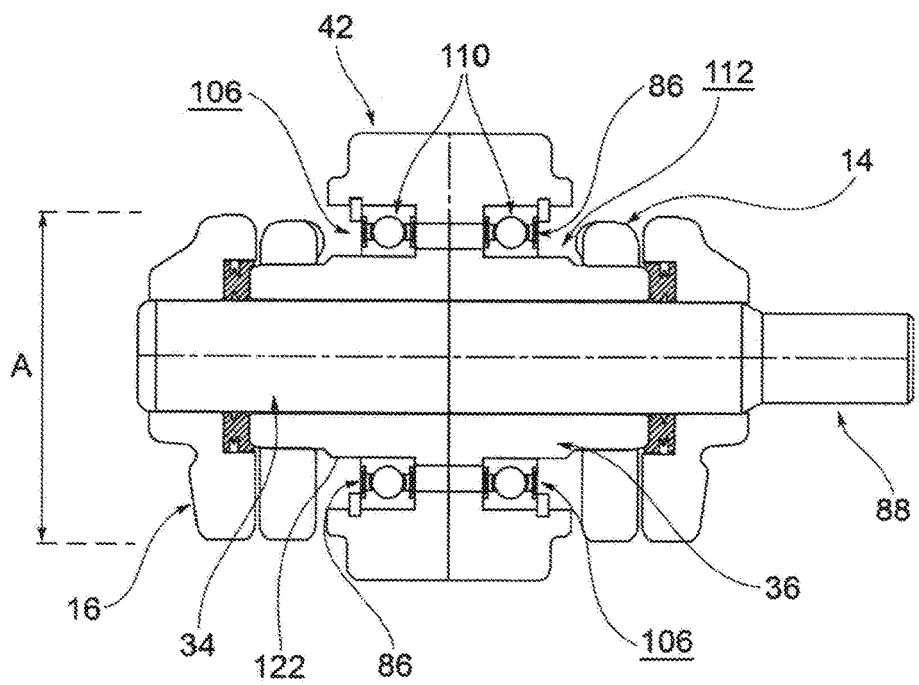

For example, the rolling means 42 could be fitted in direct contact with the bushing 36 (see for example FIGS. 30, 31), or could be in contact through rolling bodies 84, 86 interposed between said bushing 36 and said means 42 (FIGS. 32, 33).

According to a variant (FIG. 30), the rolling means 42 could be fitted directly on the bushing 36, for example in a "dry" condition (i.e. without lubrication).

According to another variant (FIG. 31), the rolling means and the protection bushing 36 could define between them at least one lubrication chamber 102 containing a lubricant fluid. For example such chamber 102 could be identified in part by an annular recess 108 made inside the bushing 36.

Optionally, the lubrication chamber 102 could be closed by a pair of sealing elements 104, 104' (for example lip seals), in particular at axial ends of the rolling means 42 or of the protection bushing 36.

According to the variant illustrated for example in FIG. 31, one or more sealing elements 104, 104' could be interposed between an outer surface 122 of the protection bushing 36 and an inner surface 124 of the rolling means 42. More specifically, a base 126 of one or more lip seals could abut with the inner surface 124, and a lip 128 of such seal (or plurality of seals) could press on the outer surface 122.

According to a non-illustrated embodiment, one or more sealing elements could be interposed between one or more outer surfaces of the rolling means and one or more inner surfaces of one or more links, preferably with an axial compression of said elements. More precisely, a base of one or more lip seals could abut with the outer surface of the rolling means and a lip of such seal (or plurality of seals) could press on the inner surface of the one or more links.

According to a further variant (FIG. 32 or FIG. 33), the rolling means and the protection bushing 36 could define between them at least one space for receiving 106 the rolling bodies 84, 86.

According to different embodiments, the rolling bodies could comprise cylinders 84 or balls 86, for example integrated in one or more roller bearings 110.

According to a further embodiment, the longitudinal member longitudinal member 10 defines at least a first longitudinal groove 38 facing the drivable surface S, and at least a second longitudinal groove 40, oriented in the opposite direction with respect to the first longitudinal groove 38.

According to this variant, the linear density of the rolling means 42 is greater in the first longitudinal groove 38 with respect to the density of the means in the second longitudinal groove 40.

According to an advantageous embodiment, the longitudinal member 10 and the one or more tracks 6, 6' comprise mechanical coupling means 88, 90 interacting with each other so that during the floating of the longitudinal member 10, said means 88, 90 prevent the unsupported track 6, 6' from bending away from the sliding trail 4.

Said means 88, 90 are therefore designed to limit the distancing of the track from the sliding trail, an inevitable condition during floating given the (considerable) weight of the forged chain according to the invention.

According to one embodiment, at least one chain 6, 8 comprises a plurality of articulation pins 34 which extend between pairs of the aforesaid links 14, 16. According to said variant, first mechanical coupling means 88 of the chain 8, 12 comprise at least one pin end 88 projecting towards the outside of the pair of links 14, 16.

It is to be noted that the term "projecting towards the outside" is understood to mean a projection of the end 88 in a direction opposite the transverse space 112 enclosed between the pair of links 14, 16.

According to a further variant, second mechanical coupling means 90 of the longitudinal member 10 comprise at least one retention wall 90, with which the pin ends 88 abut in a sliding manner and arranged so as to limit a distancing of the articulation pins 34 from the sliding trail 4.

For example, the retention wall 90 could partially superpose a longitudinal groove 38, so as to partially define it.

The longitudinal member 10 also comprises fluid-powered motor means, attached (preferably integral) to the longitudinal member 10 and configured to promote the sliding of the track 6,6' or plurality of tracks through the chains 8,12.

According to a variant of the invention, the motor means comprise a different motor 18,20 associated with each chain 8,12, these motors 18,20 being, connected in parallel and controllable so as to supply an independent power transmission. Preferably, the motors 18,20 lie side by side.

It follows that, advantageously, the greater weight of the chain comprising forged links is divided on at least one motor pair, manageable in a mutually constrained way and advantageously of reduced bulk.

According to a first preferred variant, the motors 18,20 are controlled in a synchronised manner to distribute the transmission power evenly along the width L of a single track 6.

According to a second preferred variant, the longitudinal member comprises at least a pair of flanked tracks 6,6', each associated with a different chain 8,12, where the motors 18,20 are controlled individually, synchronously or asynchronously.

In fact, for this latter variant, since the at least two chains are not mechanically connected by track shoes, there is no need to move the chains simultaneously.

Actually, for example in case one of the motors stops, the other motor could be actuated to move the other track and bring the undercarriage or vehicle 1 in a suitable environment for repair or maintenance.

Preferably, the motors 18,20 are mutually facing.

According to a further preferred variant, the motors 18, 20 comprise shafts rotatable about axes of rotation R1, R2 substantially mutually parallel and coincident.

With reference, for example, to the variant of FIG. 16, in correspondence with an end portion 10', the longitudinal member 10 defines at least one pair of support projections 22,24 to which is fixed at least part of the motors 18,20.

Preferably, the support projections 22,24 delimit between them an intermediate space 26 within which are rotatable propulsion members 28,30 of the motors 18,20 (and specifically of the gearmotors, for the variants that provide them), engaging the chains 8,12.

According to the variant schematically shown for example in FIG. 34, one or more propulsion members 28, 38 could define member recesses 114, which extend radially inwards from a peripheral rim 116 of each member 28, 38 to receive in part the protection bushing 36 or the rolling means 42 associated with it.

According to a preferred variant one or more propulsion members 28, 38 could have a substantially lobed transverse cross-section (with respect to their rotation axes R1, R2). According to a further variant, in correspondence of a second end portion 10", the longitudinal member 10 could comprise return means 70,72 of the chain 6,6'.

Figure 3:
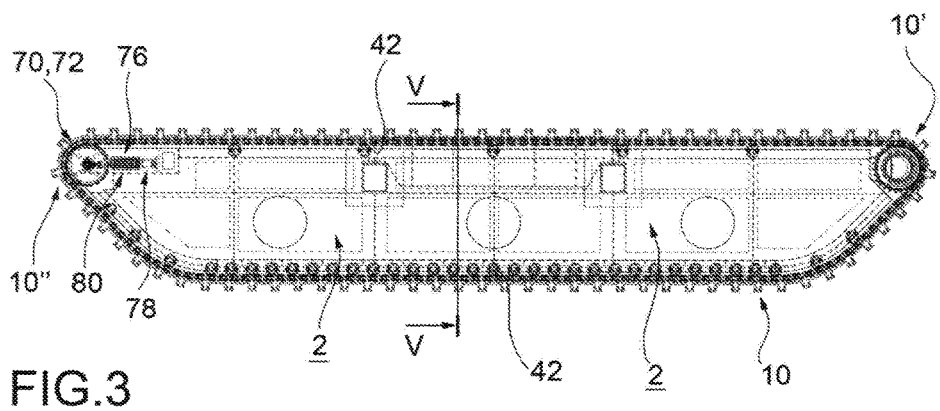
Figure 4:
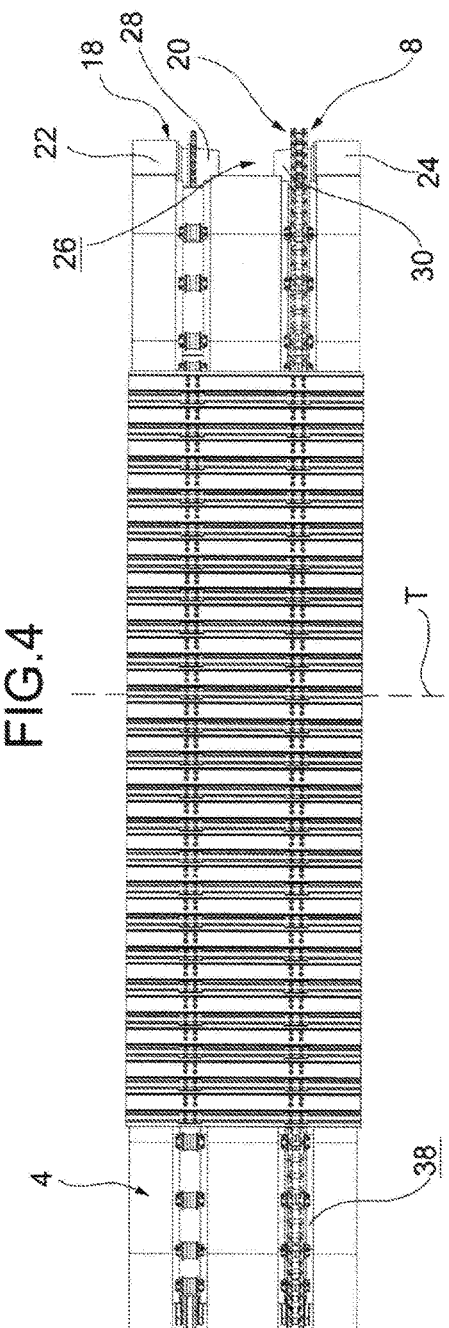
Figure 6:
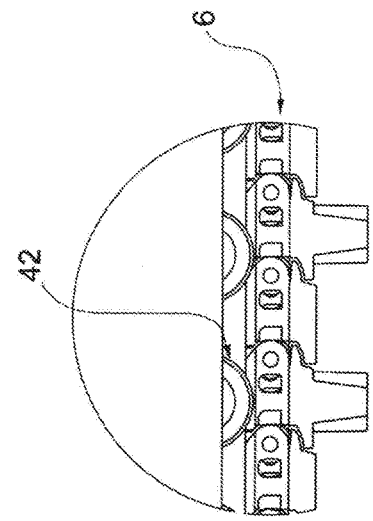
FIGS. 5 and 6 represent, respectively, a section along the plane V-V of FIG. 3 and an enlargement of the highlighted area of FIG. 2.

Preferably, the return means 70,72 could be associated with at least one device 76 for tensioning and/or cushioning of the chain 6,6', for example visible in schematic form in FIG. 3 and in more detailed form in FIG. 36 or 37.

For example, the device 76 could comprise a linear actuator 78 (for example of the hydraulic type) and/or a shock absorber 80 functionally connected between the longitudinal member and a support of the return means. In the embodiments in which there are provided both the linear actuator 78 and the shock absorber 80, such components could be arranged mechanically in series.

In an advantageous variant, the return means 70, 72 (for example in the shape of a wheel or a cylinder) could define peripheral recesses 118, which extend radially inwards from a peripheral rim 120 of each means 70, 72 to at least partially receive the protection bushing 36 or the rolling means 42 associated with it.

According to a preferred variant one or more return means 70, 72 could have a substantially lobed transverse cross-section (with respect to the respective rotation axis).

According to a particularly preferred variant, the longitudinal member 10 comprises at least one fluidic distributor 32 placed between fluid-power means 34,56 of the motors 18,20 and the motors themselves, configured to receive a fluid power flow and distribute it in parallel to the motors 18,20 to control the chains 8,12), synchronously and/or asynchronously.

According to an embodiment not illustrated, the fluidic distributor could be associated to the undercarriage 100 or to the vehicle 1, and could therefore not necessarily be comprised in (or located on) the longitudinal member 10.

The aforesaid objective is also achieved by means of a longitudinal member 10 for amphibious undercarriage, the internally defines one or more air chambers 2 for its buoyancy and externally at least one sliding trail 4, wherein such longitudinal member comprises:
- one or more tracks 6,6', which develop as a ring around the sliding trail 4 and comprising chains 8,12 flanked to each other and slidably mounted;
- fluid-powered motor means, attached to the longitudinal member 10 and configured to promote the sliding of the track 6,6' or plurality of tracks through the chains 8, 12;
wherein the chains 8,12 are controlled independently.

With regard to preferred or advantageous characteristics of this second inventive core, please refer—mutatis mutandis—to the preceding description.

Innovatively, the longitudinal member, undercarriage and vehicle of this invention allows brilliantly overcoming the drawbacks noted in relation to the prior art.

More precisely, the present invention ensures a behaviour in water at least corresponding to the currently used solutions but, from the profile of performance on land, is distinguished by a marked improvement in wear resistance with respect to the prior art.

This is mainly due to the solidity of the longitudinal member used that, for the first time in an amphibious vehicle, uses a layout and technical solutions coming, in adapted form, from an earth moving machine.

Advantageously, this invention allows avoiding the vehicle the total blockage of the vehicle in case of failure of one of the motors, since the other motor associated to the longitudinal member is designed to operate autonomously and independently.

Advantageously, this invention allows to at least partially compensating for the greater weight of the at least partially forged chain through shoes of reduced weight, achieving also additional accessory advantages.

First, in buoyancy, the use of special shoes allows a more favourable static and dynamic behaviour.

In addition to that, when used on land, this invention allows obtaining a softer support with respect to the drivable surface.

Advantageously, this invention allows reducing the accumulation of mud and water inside the track, or favouring the evacuation of mud/water in particular from the space between the track shoes and the sliding trail.

Advantageously, this invention allows and requires being able to deliver more power, but markedly containing the overall dimensions of the equipment used for this purpose.

Advantageously, the double motors of this invention are designed to be easily mountable.

Advantageously, the discussed arrangement of the motors allows protecting the rotating components from accidental shocks.

Advantageously, this invention allows easy trim adjustments and damped chain movements, even in the presence of rough terrain.

Advantageously, the present invention makes it possible to obtain a reduced dimension of the track, thanks to the shifting of the attachment means discussed earlier.

Advantageously, the present longitudinal member has been designed to allow a reliable transition from the floating condition to the condition on land and vice versa, in that the chain is partially constrained to the sliding trail even when not supported.

Advantageously the use of chains with projecting pins is a reliable and economic system for guiding the track even while floating.

To the embodiments of the aforesaid longitudinal member, undercarriage and vehicle, one skilled in the art, in order to meet specific needs, may make variants or substitutions of elements with others functionally equivalent.

Even these variants are contained within the scope of protection, as defined by the following claims.

Moreover, each of the variants described as belonging to a possible embodiment can be realised independently of the other variants described.

The invention claimed is:

1. A longitudinal member for amphibious undercarriage, defining internally one or more air chambers at least for the buoyancy of itself and externally at least one sliding trail;
wherein said longitudinal member comprises:
- one or more tracks, which develop as a ring around the sliding trail and comprising chains flanked to each other and slidably mounted, each chain comprising concatenated links;

one or more motors, attached to the longitudinal member and configured to promote the sliding of the track or plurality of tracks through the chains;

wherein the concatenated links are forged in one piece.

2. The longitudinal member according to claim 1, wherein the forged links are thick-walled, with a thickness equal to or greater than about 4 mm, to ensure high compression resistance.

3. The longitudinal member according to claim 1, wherein the links develop away from the sliding trail by a predetermined link height and wherein, for each pair of links, the chain comprises at least one articulation pin which develops between said links and at least one protection bushing associated with clearance to said pin.

4. The longitudinal member according to claim 3, wherein the outer diameter of the protection bushing and the height of the link are mutually selected so that, during the sliding of the chain, said bushing is guided distanced from the sliding trail, without touching it.

5. The longitudinal member according to claim 1, wherein, at the sliding trail, the longitudinal member defines longitudinal grooves wherein rolling means, such as idle, are at least partly housed, on which the chain is guided.

6. The longitudinal member according to claim 5, wherein the longitudinal member defines at least a first longitudinal groove facing towards a drivable surface, and at least a second longitudinal groove, oriented in the opposite direction with respect to the first longitudinal groove, the linear density of the rolling means being greater in the first longitudinal groove with respect to the second longitudinal groove.

7. The longitudinal member according to claim 5, wherein the rolling means have rotation axes integral with the sliding trail.

8. The longitudinal member according to claim 5, wherein the rolling means have rotation axes integral in translation with the chain.

9. The longitudinal member according to claim 8, wherein the rolling means are fitted coaxially to at least one protection bushing associated with clearance to at least one articulation pin, and where for each pair of links the chain comprises at least on said pin with freedom of rotation with respect to the latter, in direct contact or through rolling bodies interposed between said bushing and said means.

10. The longitudinal member according to claim 1, wherein the longitudinal member and the one or more tracks comprise at last two mechanical couplings interacting with each other so that, during floating of the longitudinal member, said mechanical couplings prevent the unsupported track from bending away from the sliding trail.

11. The longitudinal member according to claim 10, wherein at least one chain comprises a plurality of articulation pins which extend between pairs of the aforesaid links and wherein a first mechanical coupling of the chain comprises at least one pin end projecting towards the outside of the pair of links, and wherein second mechanical coupling means of the longitudinal member comprise at least one retention wall, with which the pin ends abut in a sliding manner and arranged so as to limit a distancing of the articulation pins from the sliding trail.

12. The longitudinal member according to claim 1, wherein the track comprises a plurality of track shoes set in transverse or orthogonal position with respect to one or both chains, said shoes being made of a polymer material, aluminium or an alloy thereof, in order to compensate for the weight of the forged links of said chain.

13. The longitudinal member according to claim 12, wherein the track shoes are fixed to the chains by means of attachment means crossing the thickness of the links in part.

14. The longitudinal member according to claim 12, wherein one or more track shoes are fastened to the chains by a pair of anchoring elements which extend from each chain towards an intermediate space defined between said chains.

15. The longitudinal member according to claim 14, wherein one or more anchoring elements are counter-shaped to the rolling means.

16. The longitudinal member according to claim 15, wherein the track shoes, are spaced along the ring-like development of the track, and comprise shoe bases connected to the chains, mutually adjacent and partially overlapping.

17. The longitudinal member according to claim 16, wherein:
a first edge of a track shoe defines a cross recess, wherein a second projecting edge of an adjacent track shoe is partially accommodated and wherein, at least when said track shoes reach the one or more motors, the second projecting edge is partially disengaged from the cross recess; or
the track shoes are spaced along the ring development of the track, and comprise shoe bases connected to the chains, a previous shoe base being separated from a next shoe base by a free space about corresponding to the longitudinal dimensions of a shoe base;
and/or wherein:
the one or more motors comprise gearmotors.

18. An amphibious undercarriage comprising a pair of longitudinal members according to claim 1, connected by one or more transverse elements.

19. The amphibious undercarriage according to claim 18, wherein said at least one transverse element comprises a linear actuator adjustable in extension in order to decrease/increase the mutual distance between the longitudinal members, and mechanical stopping means of a desired distance between said longitudinal members.

20. An amphibious work vehicle comprising at least one longitudinal member according to claim 1, or an amphibious undercarriage having a pair of longitudinal members according to claim 1, connected by one or more transverse elements.

* * * * *